Figure 1:
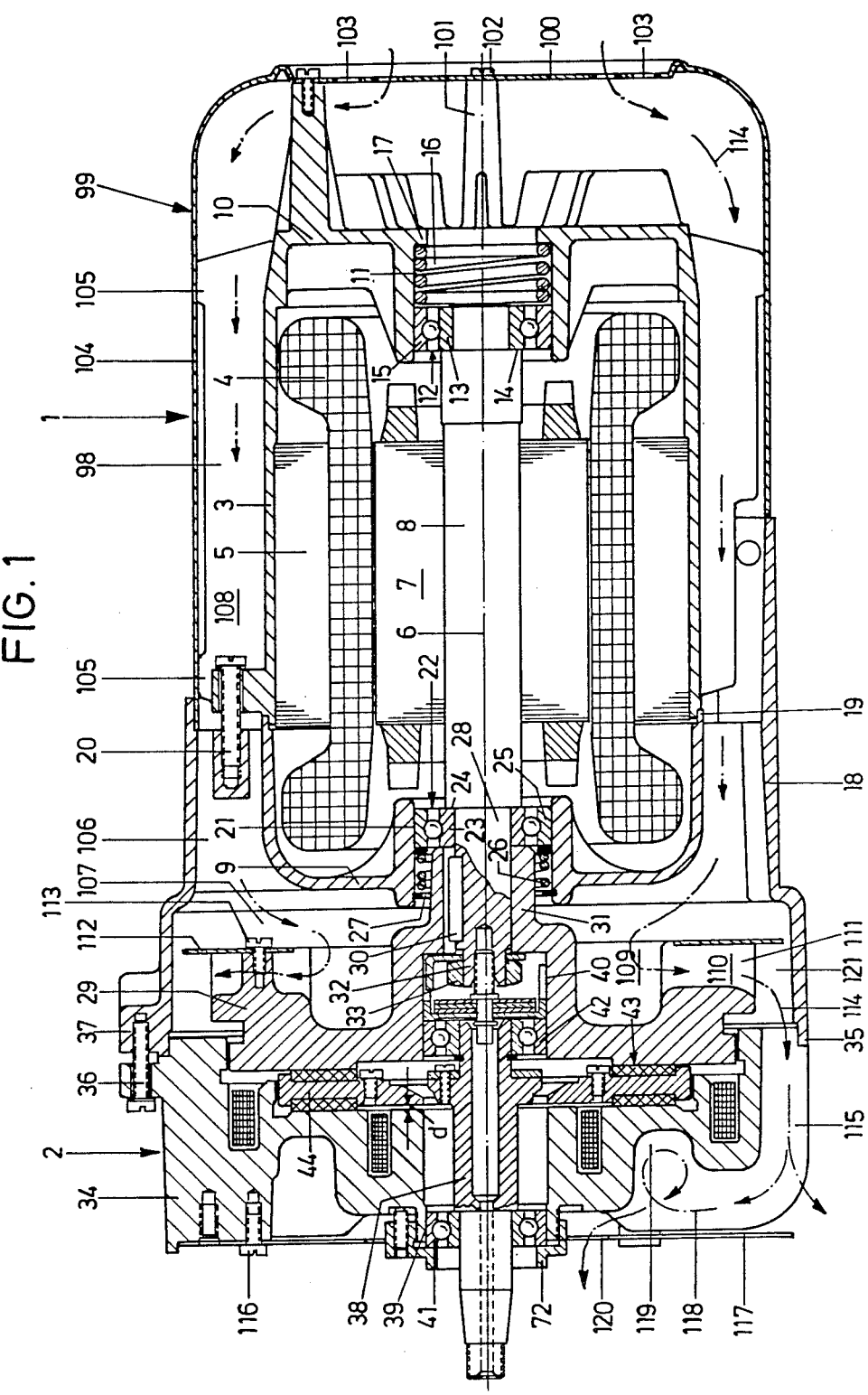

United States Patent [19]

Erndt et al.

[11] Patent Number: 4,712,660
[45] Date of Patent: Dec. 15, 1987

[54] ELECTROMOTIVE VARIABLE-SPEED AND CONTROL DRIVE PARTICULARLY FOR USE IN INDUSTRIAL SEWING MACHINES

[75] Inventors: Hans Erndt, Wiesloch; Erich Link, Brühl; Adolf Martin, Rheinstetten; Herbert Palloch, Schwetzingen, Baden; Hilmar Wittler, Karlsruhe, all of Fed. Rep. of Germany

[73] Assignee: Frankl & Kirchner GmbH & Co KG, Schwetzingen, Baden, Fed. Rep. of Germany

[21] Appl. No.: 836,328

[22] Filed: Mar. 5, 1986

[30] Foreign Application Priority Data

Mar. 8, 1985 [DE] Fed. Rep. of Germany ....... 3508310

[51] Int. Cl.⁴ ...................... F16D 67/06; F16D 13/72
[52] U.S. Cl. ................. 192/18 B; 192/84 C; 192/113 A; 310/76
[58] Field of Search .................. 192/12 D, 18 B, 48.2, 192/84 AB, 84 C, 113 A; 310/76, 98

[56] References Cited

U.S. PATENT DOCUMENTS

| | | | |
|---|---|---|---|
| 2,348,025 | 5/1944 | Peets et al. | 192/113 A |
| 2,739,251 | 3/1956 | Ingalls | 192/113 A X |
| 3,387,157 | 6/1968 | Cook et al. | 310/76 X |
| 3,885,175 | 5/1975 | Palloch | 192/18 B X |
| 3,945,476 | 3/1976 | de Jong | 192/12 D |
| 4,135,612 | 1/1979 | Lengsfeld | 192/18 B |
| 4,556,132 | 12/1985 | Lengsfeld et al. | 192/12 BA |

Primary Examiner—Rodney H. Bonck
Assistant Examiner—Richard M. Lorence
Attorney, Agent, or Firm—Felfe & Lynch

[57] ABSTRACT

An electromotive variable-speed and control drive particularly for use in industrial sewing machines comprising a motor capable of continuous drive with a disk flywheel and a brake-coupling unit connected to this motor. Cooling ribs confining cooling channels are disposed at the stator frame to achieve efficient cooling. A disk flywheel in the form of a fan is in the form of an axial-radial blower the suction area of which extends to the coupling surface of the disk flywheel. Furthermore, particularly intensive cooling of the brake end shield is possible.

7 Claims, 4 Drawing Figures

ELECTROMOTIVE VARIABLE-SPEED AND CONTROL DRIVE PARTICULARLY FOR USE IN INDUSTRIAL SEWING MACHINES

This invention relates to an electromotive variable-speed and control drive particularly for use in industrial sewing machines.

A drive of this type known from U.S. Pat. No. 4,556,132 exhibits an annular cylindrical cooling channel, positioned around the stator frame, through which the air is sucked by the disk flywheel in the form of a fan. The radial outer area of the disk flywheel exhibits channels through which the air is sucked or pushed by the reason of the disk flywheel turning. The air exits in an approximately axial direction and flows between the cooling ribs attached to the outer perimeter of the brake end shield. This does not guarantee satisfactory cooling in particular of the thermally highly-stressed disk flywheel.

An object of the invention is to provide a variable-speed and control drive particularly for use in industrial sewing machines which assures a satisfactory cooling of both motor and the coupling and brake unit.

According to the invention, a large part of the heat produced by the motor is released to the cooling air from the cooling ribs attached to the stator frame so that the warming of the shell—something which the seamstress finds particularly unpleasant—is greatly reduced. Since the air flows in an extensively straight line in the cooling channels confined by the ribs, only slight turbulence and thus an only slight resultant noise development results. Since the suction area of the fan in the form of an axial-radial blower extends to the proximity of the coupling surface particularly intensive cooling in this critical area is assured.

Also, the invention provides that a sufficient suction power of the fan is attained and, at the same time, that the cooling air is admitted to a very large part of the radial span of the thermally highly-stressed disk flywheel. The radial channels providing a high suction power and a high cooling power are realized in a constructively simple manner.

Also, the invention provides that the air exiting from the radial channels formed on the disk flywheel is redirected into a current which intensively cools the outer perimeter of the brake end shield.

The cooling of the brake end shield is additionally intensified. The invention also provides that the front side of the brake end shield is subject to particularly intensive cooling while also facilitating the prior exit of a part of the heated air possibly carrying fluff which has been sucked through the air channels. Also, the invention facilitates, as with the disk flywheel, the transport of the cooling air at the brake end shield to the proximity of the thermally highly-stressed brake area. Also, the invention facilitates the releasing of heat produced from the coupling coil or the brake coil to the cooling air along a very direct path.

Also, the invention further minimizes the degree of heat given off to the shell surrounding the stator frame.

In accordance with the invention, an electromotive variable-speed and control drive particularly for use in industrial sewing machines comprises a motor capable of continuous drive, a flywheel having a clutch surface and connected to the motor, and a clutch-brake unit connected to the motor. The drive also includes a drive shaft. The clutch-brake unit comprises a clutch-brake disk which is connected to the drive shaft non-rotatably with respect thereto. The clutch-brake unit also comprises a non-rotatable brake bearing bracket having a brake surface. The clutch-brake disk is capable of being brought into friction engagement optionally with the brake surface of the brake bearing bracket or optionally with the clutch surface of the flywheel. The motor has a stator frame and an outer shell confining a cooling region surrounding the stator frame. The flywheel forms a fan sucking cooling air. Cooling channels confined by cooling ribs are provided at the stator frame and the fan is in the form of an axial-radial blower having a suction region extending close to the clutch surface.

For a better understanding of the invention, together with other and further objects thereof, reference is made to the following description, taken in connection with the accompanying drawings, and its scope will be pointed out in the appended claims.

Figure 2:
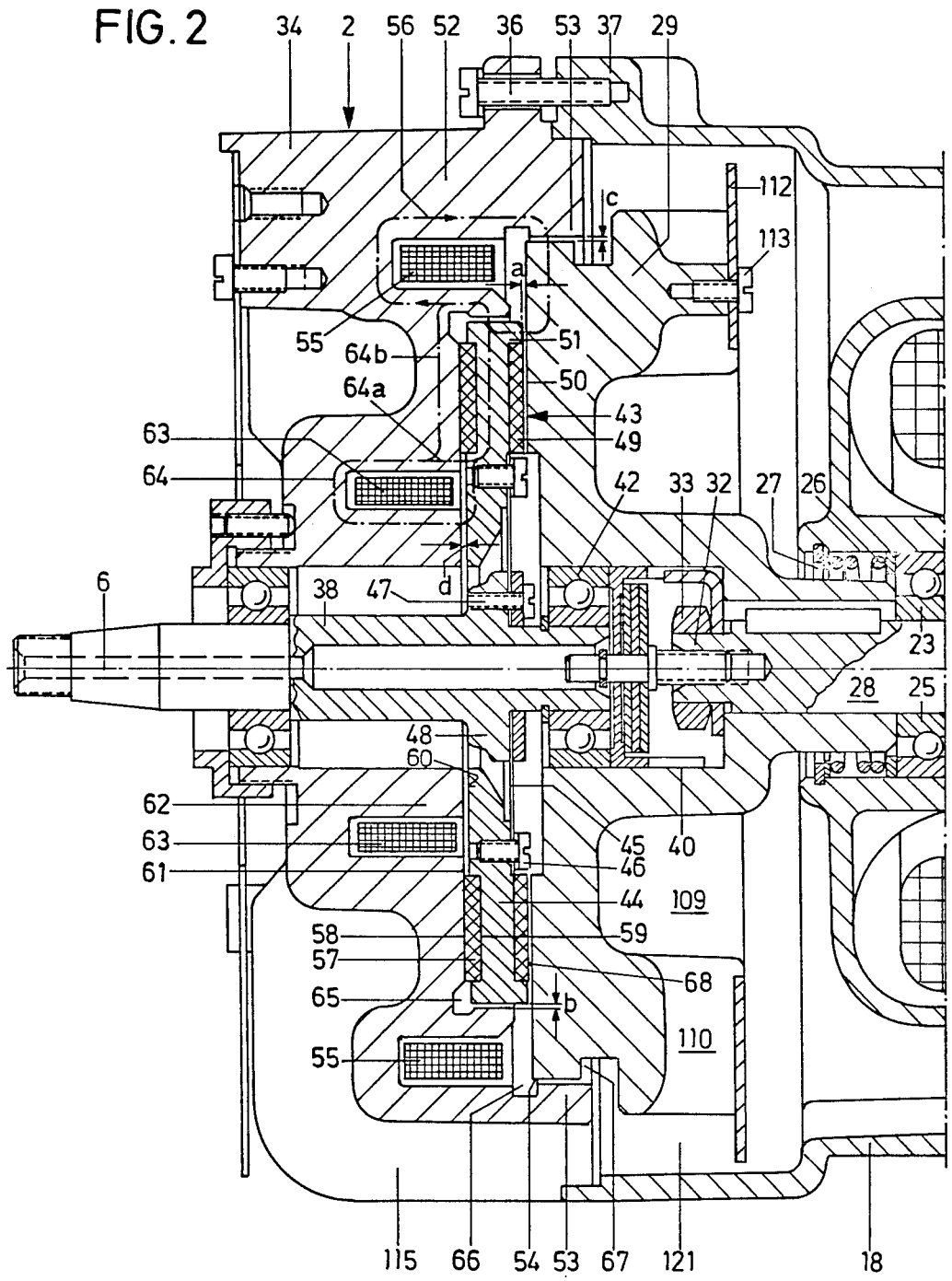
Figure 3:
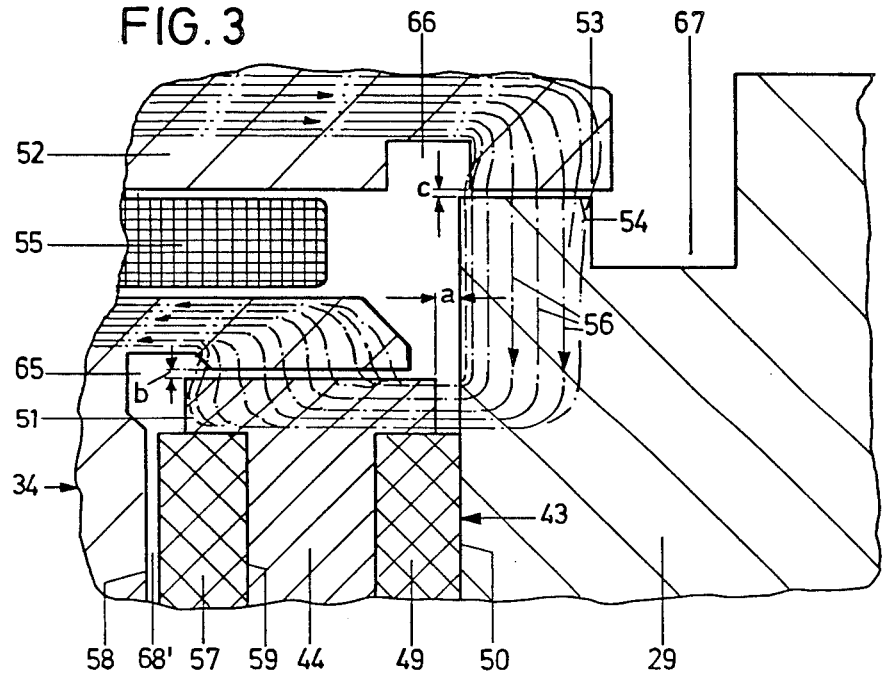
Figure 4:
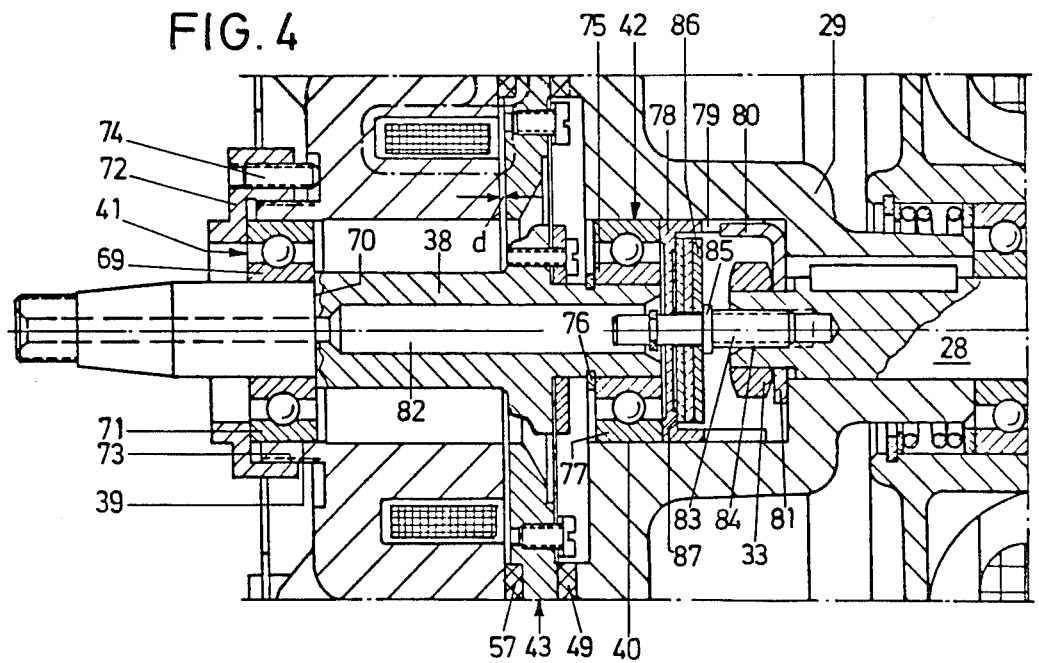

Referring now to the drawings:

FIG. 1 shows an axial longitudinal section of a drive according to the invention comprising a motor and brake-coupling unit, FIG. 2 shows the brake-coupling unit from FIG. 1 to an enlarged scale, FIG. 3 shows a partial cut-out from the brake-coupling unit, and FIG. 4 shows another partial cut-out from the brake-coupling unit.

The drive represented in the drawings comprises a motor 1 and a brake-coupling unit 1. The motor 2 preferably comprises a substantially cylindrical stator frame 3 in which a stator comprising stator windings 4 and a stator bundle of laminations 5 is positioned concentrically in the usual way. A rotor 7 is also positioned concentrically to the central longitudinal axis 6. This rotor is attached to a motor shaft 8. The motor shaft 8 is run on bearings in end shields 9, 10. The end shield 10 positioned away from the brake-coupling unit 2 (brake-clutch unit) preferably is cast in one piece with the stator frame 3. The motor shaft is run on bearings in the bearing bore hole 11 preferably by means of a rolling bearing 12 which is a radial-axial ball bearing. The inner ring 13 of the rolling bearing 12 is supported against a collar 14 of the motor shaft 8. On the other axial side the outer ring 15 of the rolling bearing 12 is supported via a pretensioned screw pressure spring 16 against a stop ring 17 which preferably is formed in one piece with the end shield 10 so that, on the one hand, it is assured that the rolling bearing 12 will not travel axially on the motor shaft 8 and, on the other hand, that axial adjustments of the motor shaft 8 within the play of the spring 16 are possible.

The end shield 9 preferably is formed in one piece with an approximately cylindrical casing 18 and screw-connected (20) via centering pins 19 to the stator frame 3 concentrically to the axis 6. The motor shaft 8 preferably is also supported in the bearing bore hole 21 of this end shield 9 via a rolling bearing 22 in the form of a radial-axial ball bearing. Here too, the inner ring 23 of the rolling bearing 22 preferably rests against a collar 24 of the motor shaft 8 while the outer ring 25 of the rolling bearing 22 preferably is supported on the other side, i.e., on the side facing the unit 2, against a locking ring 27 secured in the bearing bore hole via a pretensioned screw pressure spring 26. This ring has the same supportive function as the stop ring 17 in the end shield 10. The function of the spring 26 is to load the outer ring 25 of the rolling bearing 22 in an axial direction in order to eliminate the development of noise in this way. If an outer ring of a rolling bearing does not rest against anything, it tends towards swaying and thus towards noise development. The force of the spring 26 must be clearly smaller than that of spring 16 to avoid cancelling the function of the latter.

A disk flywheel 29 preferably is fixed by a tongue and groove connection 30 in a torsionally-rigid manner on the shaft extension 28 of the motor shaft 8 on which the rolling bearing 22 is positioned. The free front side of the hub 31 of the disk flywheel 29 preferably rests against the inner ring 23 of the rolling bearing 22 and preferably is axially tensioned against the inner ring 22 by a nut 33 screwed onto the threaded stem 32 of the shaft extension 28 at the same time being axially fixed in position opposite the motor shaft 8. The unit comprising the rotor 7, motor shaft 8 together with rolling bearings 12, 22 and the disk flywheel 29 can therefore be moved in the direction of the central longitudinal axis 6 whereby the springs 16 and 26 positioned in the direction of shift respectively exercise a counter-force.

The casing 18 is closed on the side away from the motor 1 by a brake end shield 34 (brake bearing bracket) which preferably is centered vis-a-vis the casing 18 by centering collars 35 and is thus positioned coaxially to the axis 6. The brake end shield 34 preferably is secured to an appropriate flange 37 of the casing by screws 36.

A drive shaft 38 positioned coaxially to the central longitudinal axis 6 preferably is run on bearings with full turning capacity on the one hand in a bearing bore hole 39 of the brake end shield 34, and on the other hand, in a bearing bore hole 40 in the disk flywheel 29 opposite to the latter. The drive shaft 38 preferably is also run on rolling bearings 41, 42 in the form of radial-axial ball bearings in the bore holes 39, 40 respectively. A coupling-brake disk 43 (clutch-brake disk) preferably is attached to the drive shaft 38 between the rolling bearings 41, 42. The coupling-brake disk preferably comprises an outer armature ring 44 of magnetic material. A spring washer 45 preferably is secured by screws 47 to the area of the outer edge of this armature ring 44. The spring washer 45 preferably is secured to a ring collar 48 projecting radially from the drive shaft 38 by screws 47 in the area of the inside edge of the armature ring 44. This type of fixing by a thin spring washer 45 allows the armature ring 44 to move in the direction of axis 6 and coaxially thereto.

An annular friction pad serving as coupling facing 49 (clutch facing) preferably is stuck to the side of the armature ring 44 facing the disk flywheel 29. This is assigned a corresponding toroid-shaped coupling surface 50 (clutch surface) on the facing front side of the disk flywheel 29. The armature ring 44 preferably has a ring piece 51 on its outer perimeter protruding axially to the disk flywheel 29. This ring piece 51 preferably extends to the disk flywheel 29 with a minimal axial gap a of only a few tenths of a millimeter. The outer perimeter of the annular coupling facing 49 (clutch facing) approximately rests against the inner perimeter of the ring piece 51.

The brake end shield 34 comprises a coupling coil casing 52 (clutch coil casing) which preferably surrounds the armature ring 44 with a minimal radial gap b of only a few tenths of a millimeter and which with a radially exterior annular casing piece 53 preferably surrounds a radial peripheral section 54 of the disk flywheel 29 adjacent to the coupling surface 50 also leaving a radial gap c of only a few tenths of a millimeter. An annular electro-magnetic coupling coil 55 (clutch coil) preferably is positioned in the coupling coil casing 52 of the locally-fixed brake end shield 34. When this coupling coil 55 is excited, a magnetic path 56 is closed from the coupling coil casing 52 through the casing piece 53, the radial gap c, the peripheral section 54 of the disk flywheel 29, the disk flywheel 29, the axial gap a, the ring piece 51 of the armature ring 44 and the radial gap b back to the coupling coil casing 52. The coupling facing 49 of the coupling-brake disk 43 is thereby caused to press against the coupling surface 50 of the disk flywheel 29 which in its turn causes the motor shaft 8 to be coupled with the drive shaft 38.

The armature ring 44 preferably is equipped with a friction pad serving as brake pad 57 on the side facing away from the disk flywheel 29. This brake pad preferably is also fixed by adhesion or similarly to the armature ring 44. A toroid-shaped brake surface 58 has preferably been assigned to it in the brake end shield 34. While the coupling facing 49 preferably is attached to the side of the anchor ring 45 on which the spring washer 45 is secured, the annular brake pad 57 preferably is positioned in a suitably-adapted annular recess 59 of the armature ring 44. The armature ring, preferably made of magnetic material, extends from the recess 59 radially inwards to the proximity of the ring collar 48 which creates a toroid-shaped magnetic transmission surface 60 to the armature ring 44 which is opposite to the brake coil casing surface 61 positioned radially within the brake surface 58 and aligned therewith, preferably leaving an axial gap d of only a few tenths of a millimeter in width. There preferably is a brake coil casing 62 in the brake end shield 34. This preferably is enclosed on the front side by the brake coil casing surface 61. An annular brake coil 63 preferably is positioned in this brake coil casing 62 in such a way that, on the one hand, a magnetic flux can be transmitted radially within the brake coil 63 and radially outside the brake coil 63 but still within the brake pad 57. When the brake coil 63 is excited, a brake magnetic path 64 is created of which one path 64a runs radially outside the brake coil 63 through the brake coil casing 62, the axial gap d between the brake coil casing surface 61 and the magnetic transmission surface 60 —in each case between the brake pad 57 and the brake coil 63—through the armature ring (here radially towards the center) and through the axial gap d radially within the brake coil 63 back to the brake coil casing 62. Another path 64b of the brake magnetic path 64 runs radially outwards into the coupling coil casing 52, through the radial gap b, and radially through the armature ring 44 towards the center where the two paths 64a and 64b meet again.

As can be derived from FIG. 3, the coupling coil casing 52 preferably is provided with an axial-radial undercut 65 in the area of the ring piece 51 in the region facing the brake pad 57. This undercut 65 preferably extends so far that the ring piece 52 extends into this undercut 65 approximately one millimeter in the direction of the brake end shield. The radial and axial extension of this undercut from the nearest adjacent area of the ring piece 51 preferably is larger than 0.5 mm where even more than 1 mm is preferred so that only substantially radially-directed magnetic paths can run from the coupling coil casing 52 through the radial gap b. The possibility of the ring piece 51 of the armature ring 44 "sticking" to the brake end shield 34 when the coupling coil 55 is excited is thus excluded.

The coupling magnetic path 56 preferably runs exclusively in substantially axial direction through the axial gap a so that the appropriate coupling power can be produced here. The coupling magnetic path 56 also preferably runs exclusively substantially radially in the area of the radial gap c between the peripheral section 54 of the disk flywheel 29 and the casing piece 53 of the coupling coil casing 52 so that shifting forces can be exercised on the unit comprising rotor 7, motor shaft 8 and disk flywheel 29 which can be shifted axially against the springs 16 and 26 respectively. This is achieved through additional recesses. A recess 66 preferably extends in the coupling coil casing 52 radially outwards whereby the peripheral section 54 of the disk flywheel 29 axially preferably extends into this recess 66 by about 0.5 to 1 mm.

There preferably is another recess 67 in the disk flywheel 29. This confines the cylindrical peripheral section 54 on the side facing away from the coupling-brake disk 43. The casing piece 53 preferably extends axially into this recess 67. The minimal offsetting of the peripheral section 54 to the coupling-brake disk assures that when the coupling coil 55 is excited, forces are never exercised on the disk flywheel 29 in the direction of the coupling brake coil 43. Rather, quite minimal forces acting in the opposite direction are exercised on the disk flywheel 29. It is thus assured that when the coupling coil 55 is excited, the disk flywheel 29 can never travel in the direction of the coupling-brake disk 43. The coupling coil 55 and the brake coil 63 preferably are connected in such a way that the coupling magnetic path 56 and the brake magnetic path 64b are directed against each other in the area of the coupling coil casing 52 into which both paths run. This leads to the magnetic flux being broken down more quickly and the coupling-brake disk being moved more quickly from its position at the disk flywheel 29 to position at the brake support 34 and vice-versa. As can be seen in FIG. 2, the air gap 68 between the coupling facing 49 and the coupling surface 50 preferably is approximately 0.1 to 0.2 mm wide, i.e., when switching from braking to coupling and vice-versa the armature ring 44 with the brake pad 57 and the coupling facing 49 has only a very short path to travel in both cases. FIG. 3 shows on a larger scale the air gap 68 between the brake pad 57 and the brake surface 58 which appears during coupling.

The inner ring 69 of the rolling bearing 61 supported in the brake end shield preferably is supported on the side facing the disk flywheel 29 against a stop collar 70 of the drive shaft 38. The outward facing side of the outer ring 71 of this rolling bearing 41 preferably abuts on an adjustment nut 72 which is screwed onto an exterior thread 73 surrounding the bearing bore hole 39 at the brake end shield 34. The adjustment nut 72 preferably is secured in its position relative to the brake end shield 34 by a positioning screw 74. The position of the drive shaft 38 in respect of shift movements from the brake-coupling unit 2 is fixed by the adjustment nut 72 and the above-described support of the rolling bearing 41.

The side of the inner ring 75 facing the coupling-brake disk 43, the inner ring 75 of the rolling bearing 42 supported in the disk flywheel 29, preferably abuts on a stop 76 secured to the drive shaft 43, the stop being formed by a locking ring. The side of the inner ring 75 facing motor 1 is free.

The side of the outer ring 77 of the rolling bearing 42 facing the coupling-brake disk 43 is free. The side of the outer ring 77 facing the motor 1 preferably abuts on a retaining sleeve 78 which is positioned in the bearing bore hole 40. This retaining sleeve preferably has a slit 79 into which a tongue 80 of a safety plate 81 fixed by the nut 33 extends so that this retaining sleeve 78 is torsionally-rigid against the disk flywheel 29. The drive shaft 38 preferably has a continuous bore hole 82 through which an adjustment screw 83 which is screwed into a threaded bore 84 in the shaft extension 28 can be turned by a screwdriver or similar tool. The turning of the adjustment screw 83 in this way has the effect of adjusting the axial position of the adjustment screw or rather, in particular, the axial postion of a projecting stop collar 85 attached radially hereto relative to the motor shaft 8 and thus to the disk flywheel 29. One of several bimetal disks 86 which are positioned on the adjustment screw 83 preferably is supported against this stop collar 85. The outer edge of the opposite disk, that is the bimetal disk nearest to the coupling-brake disk 43, preferably is supported against a ring edge 87 of the retaining sleeve 78. The axial position of the disk flywheel 29 relative to the drive shaft 38 is changed by screwing the adjustment screw 83 in or out of the shaft extension 28. Since the motor shaft 8 together with disk flywheel 29 is constantly pushed by the pressure spring 16 in the direction of the coupling-brake disk 43, the resting pressure force of the coupling-brake disk 43 with its brake pad 57 can be adjusted via the adjustment nut 72 against the brake area 58 of the brake end shield 34 while the air gap 68 between coupling facing 49 and the coupling surface 50 is adjusted. The coupling-brake disk 43 preferably abuts on the brake surface 58 of the brake end shield 34 with initial stress, adjustable as described, when neither the coupling coil 55 nor the brake coil 63 are excited. If the coupling facing 49 and the brake pad 57 expand due to the thermal load with high alternations, this also leads to a corresponding heating of the disk flywheel 29. This heat is conducted to the bimetal disks 86 which leads them to bend whereby the disks bend against each other according to their arrangement. This leads to the adjustment screw 83 together with the motor shaft 8 and the disk flywheel 29 being shifted in the direction of the motor 1 against the force of the spring 16. The reduction of the air gap 68 due to the thermally-caused swelling of the coupling facing and brake pad 57 is therefore compensated. A compensation of this nature is necessary since the air gap 68 should usually only be 0.1 mm wide in order to prevent thumping noises when connecting the coupling-brake disk 43. Such a small air gap must be maintained exactly however and must not be allowed to decrease during operation.

As is particularly shown in FIG. 1, cooling ribs 98 preferably are attached to the stator frame 3. These preferably are distributed over the area of the stator frame radially projecting and running parallel to axis 6. A cup-shaped cover hood 99 enclosing the cooling ribs 98 preferably is pushed over the complete stator frame 3. The floor 100 of the cover hood 99 preferably rests on spacers 101 which preferably have been cast in one piece with the end shield 10. The cover hood 99 preferably is secured to these spacers 101 by screws 102. The floor 100 of the cover hood 99 preferably has openings 103 through which cooling air can enter. The substantially cylindrical shell 104 of the cover hood 99 preferably rests on projections 105 of the cooling ribs 98 so that these only have approximate point-wise contact to the cover hood 99. A direct conduction of heat from the stator frame 3 via the cooling ribs 98 to the cover hood 99 thus only occurs to a minimal extent; the cover hood 99 is heated only minimally.

The cooling ribs 106 corresponding to the cooling ribs 98 preferably are also positioned in the casing 18. They preferably partially extend radially between the end shield 9 and the casing 18 since they support the end shield at the same time. There preferably is a free space 107 between the end shield 9 and the disk flywheel 29 in which the cooling channels 108 formed between the ribs 98 and the stator frame 3, or the shell 104 of the cover hood 99, or between the cooling ribs 106, the end shield 9 and the casing 18 come together.

There preferably is a suction area 109 in the disk flywheel 29 on the side facing the motor 1. This suction area preferably is in the form of a ring space opening into the free space 107 which surrounds the hub 31 of the disk flywheel 29. Radial channels preferably issue from this suction area 109 outwards. These are confined by radially and axially-extending ribs 111 which preferably are cast in one piece with the disk flywheel. An annular-shaped air conductor ring 112 preferably is secured by screws 113 on the side of the ribs 111 facing away from the disk flywheel 29. This ring confines the radial channels 110 extending to the motor 1. The fan formed in this way is an axial-radial blower.

The cooling air sucked through the openings flows according to the flow direction arrows 114 through the cooling channels 108, through the free space 107, the suction area 109 and through the radial channels 110. Since, as can be seen from FIG. 1, the suction area 109 extends to the proximity of the coupling surface 50, particularly efficient cooling in the critical area of the coupling surface 50 is provided.

The air flows from the radial channels 110 between the cooling ribs 115 which are formed on the outer perimeter and the front side of the brake end shield 34. A ring-shaped sheet metal cover 117 preferably is attached to the outer front side of the brake end shield 34 by screws 116 so that a part of the air flowing between the cooling ribs 115 according to the flow arrow 118 is redirected radially inwards and cools the front side of the brake end shield. Adjacent to the brake surface 58 of the brake end shield 34 and radially between the coupling coil 55 and the brake coil 63, the brake end shield 34 preferably has an annular recess 119 serving as a turbulence chamber which extends into the proximity of the coupling coil 55, the brake coil 63 and the brake surface 58. The air is swirled in the direction of the flow arrows 118 in this chamber. It then exits through a radially inner-lying outlet 120 in the sheet metal cover 117 near the adjustment nut 72.

The redirection of the cooling air issuing from the radial channels 110 in radial direction into a current flowing parallel to the axis 6 between the cooling ribs 115 preferably is effected in a redirection segment 121 which is confined on the outside by the casing 18.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electromotive variable-speed and control device particularly for use in industrial sewing machines comprising: a motor capable of continuous drive and having a motor shaft, a flywheel having a clutch surface and connected to said motor shaft, and a clutch-brake unit for selectively connecting said motor shaft to a drive shaft, said clutch-brake unit comprising a clutch-brake disk which is connected to said drive shaft non-rotatably with respect thereto, said clutch-brake unit also comprising non-rotatable brake bearing bracket having a brake surface, said clutch-brake disk being brought into friction engagement optionally with said brake surface of said brake bearing bracket or optionally with said clutch surface of said flywheel, said motor having a stator frame and an outer shell confining a cooling region surrounding said stator frame, said flywheel, when rotating, forming a fan sucking cooling air, cooling channels confined by cooling ribs being provided at said stator frame and said fan being in the form of an axial-radial blower having a suction region extending close to said clutch surface, said suction region comprising an annular recess in said flywheel and including radial channels leading out from said recess, ribs on said flywheel and an air conductor ring attached to said ribs, said radial channels being confined by said ribs on said flywheel and by said air conductor ring, and said air conductor ring being rotatable with said flywheel.

2. A drive according to claim 1, which includes a redirection segment behind said radial channels of said flywheel, taken in the direction of flow of said cooling air, said brake bearing bracket having an outer surface having cooling ribs thereon which join into said redirection segment.

3. A drive according to claim 2, wherein said brake bearing bracket has a front side which is a cooling-air-confining surface and said cooling ribs on said brake bearing bracket extend through to the front side of said brake bearing bracket.

4. A drive according to claim 3, which includes a sheet metal cover and in which said cooling ribs extending through to said front side of said brake bearing bracket are at least partially covered by said sheet metal cover.

5. A drive according to claim 4, in which said front side of said brake bearing bracket has a recess which extends into the proximity of said brake surface.

6. A drive according to claim 5, which includes a clutch coil and a brake coil in said brake bearing bracket and in which said recess on the front side of said brake bearing bracket extends to an area between said clutch coil and said brake coil in said brake bearing bracket.

7. A drive according to claim 1, in which said cooling ribs at the stator frame have a length and only a small part of said length of said cooling ribs at the stator frame rest against said outer shell.

* * * * *

UNITED STATES PATENT AND TRADEMARK OFFICE
CERTIFICATE OF CORRECTION

PATENT NO. : 4,712,660
DATED : December 15, 1987
INVENTOR(S) : Hans Erndt, et al.

It is certified that error appears in the above-identified patent and that said Letters Patent is hereby corrected as shown below:

column 2, line 31 for "brake-coupling unit 1" read -- brake-coupling unit 2 --.

column 8, lines 5 and 6 for "device" read -- drive --.

Signed and Sealed this

Fourth Day of October, 1988

Attest:

DONALD J. QUIGG

Attesting Officer

Commissioner of Patents and Trademarks